United States Patent
Silbermann et al.

(10) Patent No.: US 8,360,658 B2
(45) Date of Patent: Jan. 29, 2013

(54) BEARING

(75) Inventors: Kai Silbermann, Langenhagen (DE); Wolf-Eckart Bischoff, Salzgitter (DE)

(73) Assignee: Buehler AG, Uzwil (CH)

(*) Notice: Subject to any disclaimer, the term of this patent is extended or adjusted under 35 U.S.C. 154(b) by 575 days.

(21) Appl. No.: 11/720,241

(22) PCT Filed: Nov. 11, 2005

(86) PCT No.: PCT/CH2005/000668
§ 371 (c)(1), (2), (4) Date: Sep. 21, 2007

(87) PCT Pub. No.: WO2006/056084
PCT Pub. Date: Jun. 1, 2006

(65) Prior Publication Data
US 2008/0019631 A1 Jan. 24, 2008

(30) Foreign Application Priority Data
Nov. 29, 2004 (DE) .......................... 10 2004 057 676

(51) Int. Cl.
*F16C 33/58* (2006.01)
(52) U.S. Cl. ........................ 384/615; 384/609
(58) Field of Classification Search .................. 384/477, 384/480, 492, 499, 501, 502, 503, 513, 569, 384/570, 609, 615, 618, 622
See application file for complete search history.

(56) References Cited

U.S. PATENT DOCUMENTS

| | | | | |
|---|---|---|---|---|
| 1,071,295 A * | 8/1913 | Bruhl | ............................ | 384/499 |
| 1,931,871 A * | 10/1933 | Large | ............................ | 384/609 |
| 2,248,590 A * | 7/1941 | Smith | ............................ | 416/205 |
| 2,650,864 A * | 9/1953 | Mergen | ............................ | 384/512 |
| 3,517,975 A * | 6/1970 | Davidson et al. | ............. | 384/619 |
| 3,880,481 A * | 4/1975 | George | ............................ | 384/513 |
| 3,985,406 A | 10/1976 | Baron | | |
| 4,126,361 A | 11/1978 | Bottner | | |
| 4,128,281 A * | 12/1978 | Batkiewicz | ................... | 384/536 |
| 5,174,583 A * | 12/1992 | Orlowski et al. | ............. | 277/421 |
| 6,133,551 A * | 10/2000 | Morrison | .................... | 219/408 |

FOREIGN PATENT DOCUMENTS
DE 272 055 3/1914
GB 960 100 6/1964

* cited by examiner

*Primary Examiner* — James Pilkington
(74) *Attorney, Agent, or Firm* — Greenblum & Bernstein, P.L.C.

(57) ABSTRACT

The invention relates to a bearing assembly, which includes at least one upper segment with an upper running surface and at least one lower segment with a lower running surface. The bearing assembly also includes at least one roll element movably arranged between the upper running surface and the lower running surface.

23 Claims, 2 Drawing Sheets

BEARING

CROSS-REFERENCE TO RELATED APPLICATIONS

The present application is a U.S. National Stage of International Patent Application No. PCT/CH2005/000668 filed Nov. 11, 2005, and claims priority of German Patent Application No. 10 2004 057 676.9 filed Nov. 29, 2004.

BACKGROUND OF THE INVENTION

1. Field of the Invention

The invention relates to a bearing and, in particular, to an annular bearing or internal guide for executing planar rotational movements, e.g., in round drying kilns, furnaces, or flat-bottom distributing guides.

2. Discussion of Background Information

Ball or roller bearings with a large diameter for executing planar rotational movements are known in the art, e.g., for slewing cranes, tanks, or machine tools. Despite their size, they are fabricated with great precision, which results in correspondingly high costs. In addition, the one-part tracks of the bearing elements are very hard to handle.

SUMMARY OF THE INVENTION

An aspect of the invention is to develop a bearing that overcomes the disadvantages of prior art, and in particular is easy to manufacture and handle at a comparatively low outlay, even at large diameters.

This aspect is achieved by providing a bearing with roll elements that move freely between running surfaces of annular guides or raceways based on their design. According to the invention, the roll elements are movably arranged between the upper and lower running surfaces of upper and lower segments of a rotational guide.

This aspect can be advantageously achieved in embodiments wherein the rotational guide includes individual annular ring segments.

The bearing is designed as a rotational guide (ball bearing slewing rim), wherein the upper and lower tracks or guide paths for the milling elements, e.g., rolls or balls, are segmented. The segments are interconnected by connecting and fitting elements, wherein they preferably automatically align themselves flush to each other during assembly. Upper and lower segments are also preferably designed in such a way as to achieve a sealing effect, and protect the roll elements and tracks of the segments against environmental influences.

The segments can be self-supporting, or provided with a substructure.

An advantage to the bearing according to the invention lies in the fact that it permits greater manufacturing tolerances than usual or per DIN at large radii or diameters, and hence is easier to fabricate. The segments can also be machined more easily than a large bearing ring. Fabrication is only as accurate as required by the respective application. A straight design can also be used in place of the annular design.

The invention also provides for a bearing assembly comprising at least one upper bearing member comprising an upper running surface, a plurality of segments connected together via connecting and centering elements, a first portion arranged on one side of the upper running surface, and a second portion arranged on an opposite side of the upper running surface. At least one lower bearing member is also utilized which comprises a lower running surface, a plurality of segments connected together via connecting and centering elements, a first portion arranged on one side of the lower running surface, and a second portion arranged on an opposite side of the lower running surface. At least one roll element is movably arranged between the upper running surface and the lower running surface. A first seal is formed between the first portions of said upper bearing member and said lower bearing member. A second seal is formed between the second portions of said upper bearing member and said lower bearing member. The first seal is arranged above an imaginary horizontal line passing through a center of the at least one roll element and below an imaginary horizontal line defining an upper end of the at least one roll element. The second seal is arranged below the imaginary horizontal line passing through the center of the at least one roll element and above an imaginary horizontal line defining a lower end of the at least one roll element.

The upper running surface and the lower running surface may be one of an annular guide or raceway. The plurality of upper and lower segments may be arranged to form a rotational guide. The at least one roll element may comprise a plurality of ball roll elements arranged within the rotational guide. The at least one roll element may be a ball roller that is freely movable between the upper running surface and the lower running surface. At least one of the upper running surface and the lower running surface may be milled. The rotational guide may be arranged within a round kiln of a malting facility. The first seal and the second seal may each comprise a labyrinth seal. Each of the plurality of segments may comprise plural connecting and centering elements. Each of the plurality of segments may comprise plural connecting and centering elements. Each of the plurality of segments may be an integrally formed member that respectively includes the first portion and the second portion and the connecting and centering elements. The first seal and the second seal may be respectively formed by a configuration of the first portion and the second portion and each of the first portion and the second portion are integrally formed.

The invention also provides for a bearing assembly comprising at least one upper bearing member comprising an upper running surface, a plurality of segments each comprising connecting and centering elements, the plurality of segments being connected together via the connecting and centering elements, a first portion arranged on one side of the upper running surface, and a second portion arranged on an opposite side of the upper running surface. At least one lower bearing member comprises a lower running surface and a plurality of segments each comprising connecting and centering elements, the plurality of segments being connected together via the connecting and centering elements. A first portion is arranged on one side of the lower running surface. A second portion is arranged on an opposite side of the lower running surface. Plural ball roll elements are movably arranged between the upper running surface and the lower running surface. An integrally formed first seal is arranged between the first portions of said upper bearing member and said lower bearing member. An integrally formed second seal is arranged between the second portions of said upper bearing member and said lower bearing member. The first seal is arranged above an imaginary horizontal line passing through a center of the ball roll elements and below an imaginary horizontal line defining an upper end of the ball roll elements. The second seal is arranged below the imaginary horizontal line passing through the center of the ball roll elements and above an imaginary horizontal line defining a lower end of the ball roll elements.

The first seal and the second seal each may comprise a labyrinth seal. The bearing assembly may be arranged on a malting facility kiln. The first seal and the second seal may be respectively formed by a configuration of the first portion and the second portion.

The invention also provides for a kiln, furnace or flat-bottom distributing guide bearing assembly comprising an upper bearing member comprising an upper running surface and a plurality of segments connected together via connecting and centering elements. Each segment of the upper bearing member comprises an integrally formed first portion arranged on one side of the upper running surface and an integrally formed second portion arranged on an opposite side of the upper running surface. At least one lower bearing member comprises a lower running surface and a plurality of segments connected together via connecting and centering elements. Each segment of the lower bearing member comprises an integrally formed first portion arranged on one side of the lower running surface and an integrally formed second portion arranged on an opposite side of the lower running surface. Plural ball roll elements are movably arranged between the upper running surface and the lower running surface. A first integrally formed labyrinth seal is arranged between the first portions of the upper bearing member and the lower bearing member. A second integrally formed labyrinth seal is arranged between the second portions of the upper bearing member and the lower bearing member. The first seal and the second seal are each arranged above an imaginary horizontal line defining a lower end of the ball roll elements and are each arranged below an imaginary horizontal line defining an upper end of the ball roll elements.

The first seal may be arranged above an imaginary horizontal line passing through a center of the ball roll elements, the second seal may be arranged below the imaginary horizontal line passing through the center of the ball roll elements, and the bearing assembly is arranged on a malting facility kiln.

Each of the plurality of segments of the upper bearing member may comprise oppositely arranged connecting and centering elements and wherein each of the plurality of segments of the lower bearing member comprises oppositely arranged connecting and centering elements.

The invention also provides for a kiln, furnace or flat-bottom distributing guide bearing assembly comprising at least one upper bearing member comprising an upper running surface, a plurality of segments connected together via connecting and centering elements, a first portion arranged on one side of the upper running surface, and a second portion arranged on an opposite side of the upper running surface. At least one lower bearing member is also utilized which comprises a lower running surface, a plurality of segments connected together via connecting and centering elements, a first portion arranged on one side of the lower running surface, and a second portion arranged on an opposite side of the lower running surface. At least one roll element is movably arranged between the upper running surface and the lower running surface. An integrally formed first seal is formed between the first portions of said upper bearing member and said lower bearing member. An integrally formed second seal is formed between the second portions of said upper bearing member and said lower bearing member.

The first seal may be arranged above an imaginary horizontal line passing through a center of the at least one roll element and below an imaginary horizontal line defining an upper end of the at least one roll element, and the second seal may be arranged below the imaginary horizontal line passing through the center of the at least one roll element and above an imaginary horizontal line defining a lower end of the at least one roll element.

In embodiments, each of the plural ball roll elements is in rolling contact with more of the curved section of the upper running surface on a first side of an imaginary vertical line perpendicular to the imaginary horizontal line than on a second side of the imaginary vertical line, and wherein the at least one roll element is in rolling contact with more of the curved section of the lower running surface on said second side of the imaginary vertical line than on said first side of the imaginary vertical line.

In embodiments, the at least one roll element is in rolling contact with more of the curved section of the upper running surface on a first side of an imaginary vertical line perpendicular to the imaginary horizontal line than on a second side of the imaginary vertical line, and wherein the at least one roll element is in rolling contact with more of the curved section of the lower running surface on said second side of the imaginary vertical line than on said first side of the imaginary vertical line.

BRIEF DESCRIPTION OF THE DRAWINGS

The invention will be described in greater detail below in an exemplary embodiment based on a drawing. Shown on the drawing are.

DETAILED DESCRIPTION OF THE PRESENT INVENTION

Figure 2:
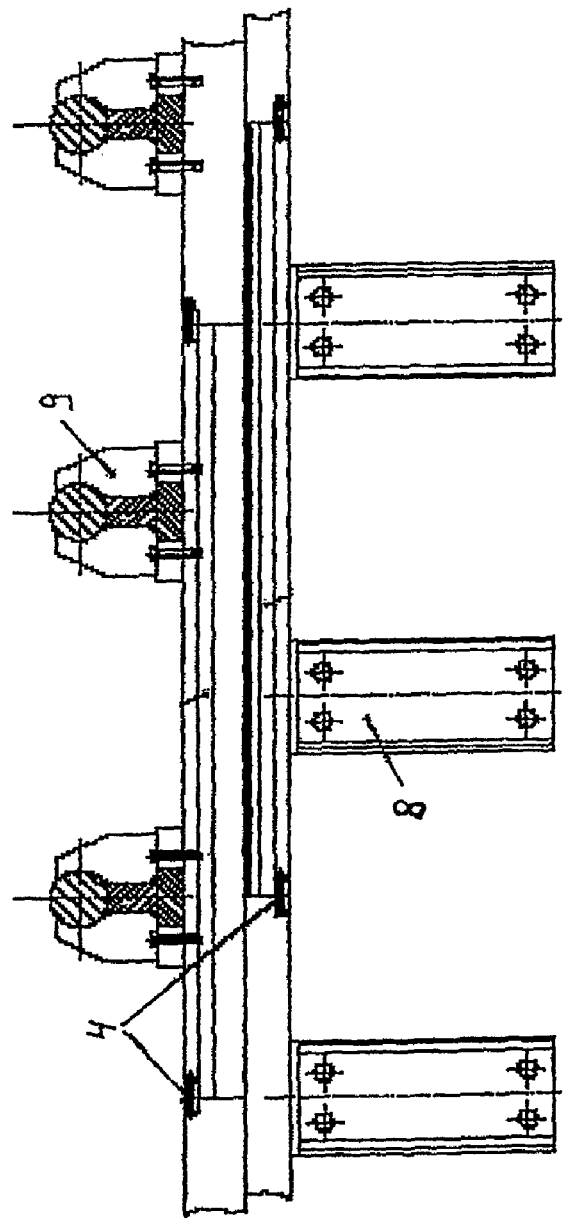
FIG. 2 illustrates the top view of a bearing arrangement in a furnace.

FIG. 2 illustrates consoles 8 of carriers 9 in a round kiln (not explicitly shown) at a malting facility with an interior tower accommodate an annular rotational guide for a screw stripper or loader/unloader. The rotational guide (interior guide) can here have a diameter of approx. 12-20 m, wherein a segmented design is possible starting at a diameter of approx. 3 m.

The rotational guide comprises of several segments (in this case 24) interconnected by connecting and centering elements 4, wherein each segment comprises of an upper segment 1 and lower segment 2. The upper and lower segments 1, 2 have tracks with running surfaces 6 and 7, between which roller balls 3 move. The running surfaces 7 are only milled, which is sufficiently precise for slow running, and reduces the manufacturing costs.

Figure 1:
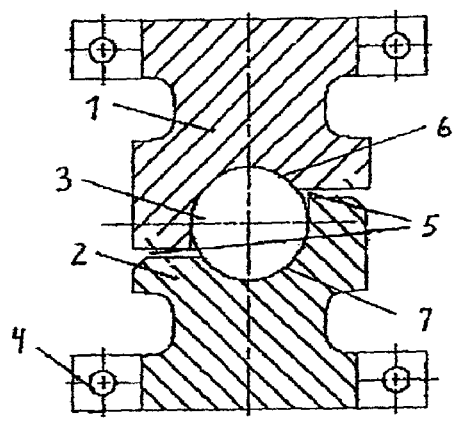
FIG. 1 illustrates a cross section of a bearing.
Figure 1A:
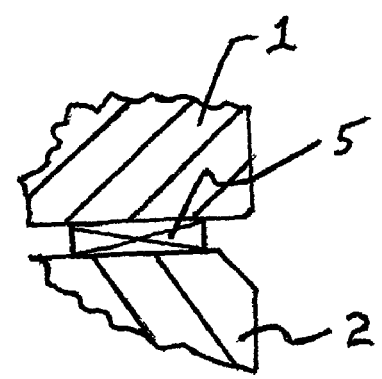
FIG. 1a shows an enlarged portion of the bearing area of FIG. 1 and illustrates schematically a labyrinth seal.

In addition, the upper and lower segments 1, 2 are designed in such a way that a seal 5 is formed, securing the roller balls 3 and running surfaces 6, 7 against contaminants. The seal 5 can take the form of a labyrinth seal 10, for example, as schematically shown in FIG. 1a.

The seal 5 has an inner side which is adjacent to the roller balls 3 and an exterior side which is distal from the roller balls 3. The connecting and centering elements 4 are arranged further from said roller balls 3 than the exterior side of the seal 5.

REFERENCES

1 Upper segment
2 Lower segment
3 Roller ball
4 Connecting and centering element
5 Seal
6 Running surface 7 Running surface
8 Console
9 Carrier

The invention claimed is:

1. A bearing assembly comprising:
at least one upper bearing member comprising:
an upper running surface;
a plurality of segments connected together via connecting and centering elements;
a first portion arranged on one side of the upper running surface; and
a second portion arranged on an opposite side of the upper running surface;
at least one lower bearing member comprising:
a lower running surface;
a plurality of segments connected together via connecting and centering elements;
a first portion arranged on one side of the lower running surface; and
a second portion arranged on an opposite side of the lower running surface;
at least one roll element movably arranged between the upper running surface and the lower running surface;
a first seal formed between the first portions of said upper bearing member and said lower bearing member, the first seal having an inner side adjacent to said at least one roll element and an exterior side distal from said at least one roll element; and
a second seal formed between the second portions of said upper bearing member and said lower bearing member, the second seal having an inner side adjacent to said at least one roll element and an exterior side distal from said at least one roll element;
wherein the first seal is arranged completely above an imaginary horizontal line passing through a center of the at least one roll element and below an imaginary horizontal line defining an upper end of the at least one roll element,
wherein the second seal is arranged completely below the imaginary horizontal line passing through the center of the at least one roll element and above an imaginary horizontal line defining a lower end of the at least one roll element, and
wherein the connecting and centering elements are arranged further from said at least one roll element than the exterior side of the first seal and the exterior side of the second seal.

2. The bearing assembly of claim 1, wherein the upper running surface and the lower running surface are one of an annular guide or raceway.

3. The bearing assembly of claim 1, wherein the at least one roll element is a ball roller that is freely movable between the upper running surface and the lower running surface.

4. The bearing assembly of claim 1, wherein at least one of the upper running surface and the lower running surface is milled.

5. The bearing assembly of claim 1, wherein the first seal and the second seal each comprise a labyrinth seal.

6. The bearing assembly of claim 1, wherein each of the plurality of segments comprises plural connecting and centering elements.

7. The bearing assembly of claim 1, wherein each of the plurality of segments is an integrally formed member that respectively includes the first portion and the second portion and the connecting and centering elements.

8. The bearing assembly of claim 1, wherein the first seal and the second seal are respectively formed by a configuration of the first portion and the second portion and each of the first portion and the second portion are integrally formed.

9. The bearing assembly of claim 1, wherein each of the plurality of segments of the upper bearing member comprises oppositely arranged connecting and centering elements and wherein each of the plurality of segments of the lower bearing member comprises oppositely arranged connecting and centering elements.

10. The bearing assembly of claim 1, wherein the at least one roll element is in rolling contact with more of a curved section of the upper running surface on a first side of an imaginary vertical line perpendicular to the imaginary horizontal line than on a second side of the imaginary vertical line, and wherein the at least one roll element is in rolling contact with more of a curved section of the lower running surface on said second side of the imaginary vertical line than on said first side of the imaginary vertical line.

11. The bearing assembly of claim 1, wherein the plurality of upper segments and the plurality of lower segments are arranged to form a rotational guide.

12. The bearing assembly of claim 11, wherein the at least one roll element comprises a plurality of ball roll elements arranged within the rotational guide.

13. The bearing assembly of claim 11, wherein the rotational guide is arranged within a round kiln of a malting facility.

14. A bearing assembly comprising:
at least one upper bearing member comprising:
an upper running surface;
a plurality of segments each comprising connecting and centering elements, the plurality of segments being connected together via the connecting and centering elements;
a first portion arranged on one side of the upper running surface; and
a second portion arranged on an opposite side of the upper running surface;
at least one lower bearing member comprising:
a lower running surface;
a plurality of segments each comprising connecting and centering elements, the plurality of segments being connected together via the connecting and centering elements;
a first portion arranged on one side of the lower running surface; and
a second portion arranged on an opposite side of the lower running surface;
plural ball roll elements movably arranged between the upper running surface and the lower running surface;
an integrally formed first seal arranged between the first portions of said upper bearing member and said lower bearing member, the first seal having an inner side adjacent to said plural ball roll elements and an exterior side distal from said plural ball roll elements; and
an integrally formed second seal arranged between the second portions of said upper bearing member and said lower bearing member, the second seal having an inner side adjacent to said plural ball roll elements and an exterior side distal from said plural ball roll elements,
wherein the first seal is arranged completely above an imaginary horizontal line passing through a center of the ball roll elements and below an imaginary horizontal line defining an upper end of the ball roll elements,
wherein the second seal is arranged completely below the imaginary horizontal line passing through the center of the ball roll elements and above an imaginary horizontal line defining a lower end of the ball roll elements element, and wherein the connecting and centering elements are arranged further from said plural ball elements than the exterior side of the first seal and the exterior side of the second seal.

15. The bearing assembly of claim 14, wherein the first seal and the second seal each comprise a labyrinth seal.

16. The bearing assembly of claim 14, wherein the bearing assembly is arranged on a malting facility kiln.

17. The bearing assembly of claim 14, wherein the first seal and the second seal are respectively formed by a configuration of the first portion and the second portion.

18. The bearing assembly of claim 14, wherein each of the plural ball roll elements is in rolling contact with more of a curved section of the upper running surface on a first side of an imaginary vertical line perpendicular to the imaginary horizontal line than on a second side of the imaginary vertical line, and wherein the plural ball roll elements are in rolling contact with more of a curved section of the lower running surface on said second side of the imaginary vertical line than on said first side of the imaginary vertical line.

19. A bearing assembly comprising:
   an upper bearing member comprising an upper running surface and a plurality of segments connected together via connecting and centering elements;
   each segment of the upper bearing member comprising:
      an integrally formed first portion arranged on one side of the upper running surface; and
      an integrally formed second portion arranged on an opposite side of the upper running surface;
   at least one lower bearing member comprising a lower running surface and a plurality of segments connected together via connecting and centering elements;
   each segment of the lower bearing member comprising:
      an integrally formed first portion arranged on one side of the lower running surface; and
      an integrally formed second portion arranged on an opposite side of the lower running surface;
   plural ball roll elements movably arranged between the upper running surface and the lower running surface;
   a first integrally formed labyrinth seal arranged between the first portion of the upper bearing member and the first portion of the lower bearing member, the first integrally formed labyrinth seal having an inner side adjacent to said plural ball roll elements and an exterior side distal from said plural ball roll elements; and
   a second integrally formed labyrinth seal arranged between the second portion of the upper bearing member and the second portion of the lower bearing member, the second integrally formed labyrinth seal having an inner side adjacent to said plural ball roll elements and an exterior side distal from said plural ball roll elements,
   wherein the first seal and the second seal are each arranged completely above an imaginary horizontal line defining a lower end of the ball roll elements and are each arranged completely below an imaginary horizontal line defining an upper end of the ball roll elements, and
   wherein the connecting and centering elements are arranged further from said plural ball roll elements than the exterior side of the first seal and the exterior side of the second seal.

20. The bearing assembly of claim 19, wherein the first integrally formed labyrinth seal
   is arranged completely above an imaginary horizontal line passing through a center of the ball roll elements;
   the second integrally formed labyrinth seal is arranged completely below the imaginary horizontal line passing through the center of the ball roll elements; and
   the bearing assembly is arranged on a malting facility kiln.

21. A malting facility kiln, furnace or flat-bottom distributing guide bearing assembly comprising:
   at least one upper bearing member comprising:
      an upper running surface;
      a plurality of segments connected together via connecting and centering elements;
      a first portion arranged on one side of the upper running surface; and
      a second portion arranged on an opposite side of the upper running surface;
   at least one lower bearing member comprising:
      a lower running surface;
      a plurality of segments connected together via connecting and centering elements;
      a first portion arranged on one side of the lower running surface; and
      a second portion arranged on an opposite side of the lower running surface;
   at least one roll element movably arranged between the upper running surface and the lower running surface;
   an integrally formed first seal formed between the first portions of said upper bearing member and said lower bearing member, the first seal having an inner side adjacent to said at least one roll element and an exterior side distal from said at least one roll element; and
   an integrally formed second seal formed between the second portions of said upper bearing member and said lower bearing member, the second seal having an inner side adjacent to said at least one roll element and an exterior side distal from said at least one roll element,
   wherein the first seal is arranged completely above an imaginary horizontal line passing through a center of the at least one roll element and below an imaginary horizontal line defining an upper end of the at least one roll element, and wherein the second seal is arranged completely below the imaginary horizontal line passing through the center of the at least one roll element and above an imaginary horizontal line defining a lower end of the at least one roll element, and
   wherein the connecting and centering elements are arranged further from said at least one roll element than the exterior side of the first seal and the exterior side of the second seal.

22. The bearing assembly of claim 21, wherein the first seal and the second seal each comprise a labyrinth seal.

23. The bearing assembly of claim 22, wherein each of the plurality of segments comprises plural connecting and centering elements.

* * * * *